US011985483B2

(12) United States Patent
Naumann et al.

(10) Patent No.: US 11,985,483 B2
(45) Date of Patent: May 14, 2024

(54) METHOD FOR OPERATING A HEARING AID, HEARING AID AND COMPUTER PROGRAM PRODUCT

(71) Applicant: Sivantos Pte. Ltd., Singapore (SG)

(72) Inventors: Frank Naumann, Bubenreuth (DE); Ronny Hannemann, Buckenhof (DE)

(73) Assignee: Sivantos Pte. Ltd., Singapore (SG)

( * ) Notice: Subject to any disclaimer, the term of this patent is extended or adjusted under 35 U.S.C. 154(b) by 69 days.

(21) Appl. No.: 17/578,913

(22) Filed: Jan. 19, 2022

(65) Prior Publication Data

US 2022/0240031 A1 Jul. 28, 2022

(30) Foreign Application Priority Data

Jan. 25, 2021 (DE) ..................... 10 2021 200 635.3

(51) Int. Cl.
*H04R 25/00* (2006.01)

(52) U.S. Cl.
CPC ......... *H04R 25/652* (2013.01); *H04R 25/603* (2019.05); *H04R 2460/11* (2013.01)

(58) Field of Classification Search
CPC ...... H04R 25/00; H04R 25/50; H04R 25/652; H04R 25/603; H04R 2460/11
USPC ................................ 381/312, 314, 322, 324
See application file for complete search history.

(56) References Cited

U.S. PATENT DOCUMENTS

| | | | |
|---|---|---|---|
| 8,655,003 | B2 | 2/2014 | Duisters et al. |
| 10,609,494 | B2 | 3/2020 | Hannemann et al. |
| 10,687,153 | B2 | 6/2020 | Albahri et al. |
| 10,827,285 | B2 | 11/2020 | Hannemann et al. |
| 10,869,141 | B2 | 12/2020 | Albahri et al. |
| 11,228,848 | B2 | 1/2022 | Thomsen et al. |
| 2016/0150331 | A1 | 5/2016 | Wenzel |
| 2017/0215011 | A1 | 7/2017 | Goldstein |

FOREIGN PATENT DOCUMENTS

| | | | |
|---|---|---|---|
| DE | 102009010603 | A1 | 5/2010 |
| DE | 202018107147 | U1 | 1/2019 |
| DE | 202018107151 | U1 | 1/2019 |
| DE | 102018221807 | A1 | 7/2019 |
| EP | 3445067 | A1 | 2/2019 |
| EP | 3445068 | A1 | 2/2019 |
| EP | 3627848 | A1 | 3/2020 |
| EP | 3675526 | A1 | 7/2020 |
| EP | 3694227 | A1 | 8/2020 |
| WO | 2010140087 | A1 | 12/2010 |
| WO | 2020236911 | A1 | 11/2020 |

*Primary Examiner* — George C Monikang

(74) *Attorney, Agent, or Firm* — Laurence A. Greenberg; Werner H. Stemer; Ralph E. Locher

(57) ABSTRACT

A method for operating a hearing aid which has a vent and the vent has a controllable closure for opening and closing the vent. The opening and closing of the vent is linked via a control rule to an environmental parameter, wherein the vent is controlled depending on the environmental parameter. The environmental parameter is ascertained and the vent is opened or closed in accordance with the control rule depending on the environmental parameter. The control rule is configured user-specifically. There are also described a corresponding hearing aid and a computer program product.

25 Claims, 3 Drawing Sheets

METHOD FOR OPERATING A HEARING AID, HEARING AID AND COMPUTER PROGRAM PRODUCT

CROSS-REFERENCE TO RELATED APPLICATION

This application claims the priority, under 35 U.S.C. § 119, of German patent application DE 10 2021 200 635.3, filed Jan. 25, 2021; the prior application is herewith incorporated by reference in its entirety.

FIELD AND BACKGROUND OF THE INVENTION

The invention relates to a method for the operation of a hearing aid, as well as a corresponding hearing aid and furthermore a computer program product for a supplementary device in connection with a corresponding hearing aid.

A hearing aid is usually used to output an audio signal to a user of the hearing aid. The output is made here by means of an output transducer, usually along an acoustic path via airborne sound by means of what is known as an earphone which is also referred to as a loudspeaker or receiver. One particular embodiment of a hearing aid is used to supply sound to a user who has a hearing deficit. The hearing aid comprises at least one acoustic input transducer for this purpose, typically a microphone, and a control unit. The control unit is designed to process an input signal that is generated from the environmental (ambient) sound by the input transducer, and thereby at least partially to compensate for the hearing deficit of the user. In the particular case of a hearing aid, a variant is also possible in which the output transducer is designed to couple the audio signal into the hearing organs of the user mechanically or electrically (e.g., a cochlear implant).

Devices such as so-called tinnitus-maskers, headsets, headphones, and the like are included here with the general term "hearing aid."

A hearing aid usually comprises an earpiece that is inserted into an auditory canal of the user and then seals it against the environment. A partial volume of the auditory canal is then closed by the earpiece, and separated from the environment. The hearing aid itself can also be designed as the earpiece, for example in a CIC (completely in the canal) hearing aid which is inserted completely into the auditory canal. Regardless of the specific embodiment of the hearing aid, closing the auditory canal by an earpiece leads to what is known as the occlusion effect. The user then perceives their own voice particularly clearly. To avoid this, it is possible for the hearing aid to be designed with what is known as a vent, usually a simple channel or tube, in order to establish a connection between the two sides of the earpiece and to reduce the occlusion effect. Air can be exchanged through the vent between the environment and the closed partial volume. A pressure equalization is also achieved in this way. A vent, however, has the disadvantage that sound signals that are output by the output transducer reach the environment and, in connection with the input transducer, result in disturbing feedback.

European published patent application EP 3 675 526 A1 describes a hearing aid with a vent comprising a valve in order to open and close the vent in different situations.

SUMMARY OF THE INVENTION

Against this background, it is an object of the invention to provide an improved method for the operation of a hearing aid as well as a corresponding hearing aid. Opening and closing a vent of the hearing aid should, in particular, be carried out as optimally as possible. A computer program product should also be given which can be executed on a supplementary device and, in association with a corresponding hearing aid, enables an optimization of the opening and closing of the vent.

With the above and other objects in view there is provided, in accordance with the invention, a method of operating a hearing aid of a user, the method comprising:

- providing the hearing aid with a vent and an adjustable closure for selectively opening and closing the vent;
- linking the opening and closing of the vent to an environmental parameter by a control rule;
- controlling the vent in dependence on the environmental parameter, by acquiring the environmental parameter and selectively opening or closing the vent in accordance with the control rule in dependence on the environmental parameter; and
- configuring the control rule user-specifically for the user.

In other words, the objects of the invention are achieved by the novel method for operating a hearing aid, by a corresponding hearing aid and hearing aid system that is configured to perform the method, and by a computer program product.

The explanations in connection with the method also apply analogously to the hearing aid and to the computer program product, and in particular also to a supplementary device and a hearing system, which is a combination of the hearing aid and the supplementary device. Inasmuch as method steps of the method are described below, advantageous embodiments emerge for the hearing aid, the supplementary device and the computer program product, in particular in that these are each designed to carry out one or more of these method steps.

A central concept of the invention is, in particular, a user-specific opening and closing of a vent of a hearing aid, i.e., an individual control of an active vent of a hearing aid. This is based on the consideration that when a vent can be optionally opened and closed, the user's sense of precisely when the vent should be open or closed is individual, and can differ from one user to another.

The method according to the invention serves for the operation of a hearing aid. The hearing aid is assigned to a user and is used by the user during intended use. A change of user is typically not provided for. The hearing aid is used to output an audio signal to a user of the hearing aid. The output is made here by means of an output transducer, preferably by means of what is known as an earphone, which is also referred to as a loudspeaker or receiver. An embodiment in which the hearing aid is used to supply sound to a user who has a hearing deficit is particularly preferred. The hearing aid comprises at least one acoustic input transducer for this purpose, appropriately a microphone, and a control unit. The control unit is designed to process an input signal that is generated from the environmental sound of the environment by the input transducer, and thereby at least partially to compensate for the hearing deficit of the user. The term "hearing aid" is, however, used here in a general sense, and therefore also includes other devices such as what are known as tinnitus-maskers, headsets, headphones and the like, i.e., in general devices that are assigned to a single user, are carried by said user and serve for individual sound output to this user.

The hearing aid comprises a vent to avoid occlusion, in particular when the hearing aid is used as intended. The vent is, in particular, a part of an earpiece of the hearing aid. The vent is, for example, a simple channel or tube. The earpiece is worn by the user in the auditory canal when used as intended. The purpose of the vent is to establish a connection between the two sides of the earpiece, and to reduce an occlusion, i.e., closure, and an occlusion effect caused thereby. An exchange of air between the environment and a partial volume of the auditory canal that is closed by the earpiece is enabled by the vent. Depending on the embodiment of the hearing aid, sound signals that are output by the output transducer can in principle also reach the environment through the vent, and be recorded there by the input transducer.

The vent comprises an adjustable closure for opening and closing the vent, i.e., to set a degree of opening of the vent. The closure is, for example, a valve. By opening and closing, the vent is accordingly opened or closed, and thus the degree of opening is set. If the vent is fully opened, it lets air through and the degree of opening amounts, for example, to "1". If the vent is fully closed, it lets no air through and the degree of opening amounts, for example, to "0". Fundamentally, even an embodiment in which the vent can merely be switched between two states with different degrees of opening, wherein the two degrees of opening do not necessarily have to be "fully open" and "fully closed", is suitable. Apart from a vent with just two degrees of opening, an embodiment in which the vent has more than two degrees of opening, or in which the degree of opening can even be continuously adjusted between a maximum and a minimum degree of opening, is also advantageous. Without restricting the generality, a vent is assumed below that is either open or closed, and thus has two degrees of opening.

The opening and closing of the vent is linked to an environmental parameter by a control rule. The control rule is, in particular, a function of the environmental parameter, and specifies an appropriate degree of opening corresponding to different values of this environmental parameter. The precise embodiment of the environmental parameter and of the control rule is not initially relevant; only the connection between the opening and closing of the vent and the environmental parameter, so that an active vent is realized that is opened and closed depending on the environmental parameter, in particular automatically, is important at first. The opening and closing in particular takes place in that the vent, in particular its closure, is driven by a control unit of the hearing aid. The control rule is in particular also placed, for example stored, in the control unit.

In operation, the vent is now controlled, in particular automatically, depending on the environmental parameter, in that the environmental parameter is ascertained, preferably measured, and the vent is opened or closed, i.e., in that the degree of opening is set, in accordance with the control rule depending on the environmental parameter. The environmental parameter is measured by means of an appropriate sensor, for example using a microphone of the hearing aid.

An important aspect is, in this case, that the control rule is configured in a user-specific manner, i.e., that the opening and closing of the vent is adjusted individually to the user. In this way it is ensured that the opening and closing of the vent is carried out as optimally as possible, and is matched to the user of the hearing aid. This is based on the consideration that different users react on the one hand to the occlusion effect and on the other hand to disturbing noises to different degrees, and that a user-specific control of the vent is therefore accordingly advantageous in order to react to individual sensitivities. More precisely, it is necessary to essentially weigh the advantages and disadvantages of an open and a closed vent against each other, and an individual balance is therefore advantageous.

It is helpful in many environments to open the vent initially, while in other environments it is more helpful to close the vent. This is taken into consideration by the controller depending on the environmental parameter, wherein the environmental parameter characterizes the environment and thus supplies an indication as to which degree of opening is most helpful at the moment. This is realized by the control rule. It is, moreover, also recognized in the present case that the assessment as to whether the vent would be better open or closed in a given environment also has a subjective aspect that depends on the user. This is now taken into consideration, in that the control rule is configured in a user-specific manner. As a result it is possible that a different degree of opening is chosen for the vent for different users in the same environment with the same environmental parameter; in an extreme case the vent is fully opened for one user and fully closed for a different user in the same environment.

Basically, the vent is advantageously opened if the environmental parameter indicates a quiet environment, i.e., an environment with little disturbing noise. In this case, the occlusion effect can advantageously be reduced, since little disturbing noise can penetrate through the vent into the auditory canal, and only a low level of amplification is necessary, whereby the risk of feedback is relatively low. Conversely, the vent is advantageously closed if the environmental parameter indicates a loud environment, i.e., an environment with strong disturbing noise, in which, expediently, a directional hearing of the hearing aid is additionally activated in order to mask out the disturbing noises in the environment to a large extent. A closed vent is also generally advantageous when the noises from the environment are not significant, in particular when audio streaming with the hearing aid or when telephoning with the hearing aid. By closing the vent, the signal-to-noise ratio (abbreviated to SNR) and the amplification of low frequencies are improved.

It will be clear from what has just been said that a balance must be reached as to when the vent is opened and when it is closed. In the present case the preferences of the respective user are taken into consideration in achieving this balance through the control rule being configured in a user-specific manner, so that the opening and closing of the vent is optimally matched to the needs of the user. Whereas some users react very sensitively to disturbing noises, and reach a high level of stress quickly in their presence, other users react rather more sensitively to the perception of their own voice. For the first users, the vent is therefore expediently closed particularly early or aggressively, i.e., for example, as soon as disturbing noises are detected in the environment, whereas for the latter users the vent is expediently closed particularly late or defensively, in order to avoid the occlusion effect in as many environmental situations as possible. Precisely how the control rule is configured for this purpose, and then represents the corresponding behavior, consequently depends on the respective user, and can accordingly differ greatly. The key point is that a degree opening for the vent is assigned user-specifically to a respective value of the environmental parameter, so that an assignment results that is then in addition user-specific, in order to take individual needs into consideration. The ascertainment of these needs and the user-specific configuration of the control rule can be done in a variety of ways; some advantageous embodiments are described in more detail below. It is fundamentally possible for these to be combined with one another.

The environmental parameter is, preferably, an environmental volume or a signal-to-noise ratio (SNR) of the environment. The environmental volume is also referred to as “ambient noise,” and corresponds in particular to the level of the sum of all the noises in the environment of the user. The “signal-to-noise ratio of the environment” is understood to mean in particular the signal-to-noise ratio in the environment of the user, i.e., the ratio of a meaningful signal to other signals in the environment. The SNR is, in particular, an SNR of a total signal that contains the sum of all the noises in the environment of the user. Depending on the environmental volume or the signal-to-noise ratio, the vent is then opened or closed, wherein the precise values or intervals of the environmental volume or of the signal-to-noise ratio for which an opening or closing results are user-specific, so that in spite of the same environmental volume or the same signal-to-noise ratio, it may occur that different degrees of opening are set for two different users. Without restricting the generality, it is assumed below that the environmental parameter is the environmental volume. The explanations, however, also apply analogously to embodiments in which the environmental parameter is a signal-to-noise ratio of the environment.

The vent is preferably closed at a first value of the environmental volume and opened at a second value that is lower than the first value. The vent is thereby opened at a low environmental volume and closed at a high environmental volume. The relative terms “low” and “high” here reflect the circumstance that the specific values are chosen in a user-specific manner. In this control rule, the first and the second value are accordingly selected in a user-specific manner, so that the control rule as a whole is configured user-specifically.

In a particularly preferred embodiment, the control rule is configured in such a way that the vent is closed above a threshold value for the environmental parameter and is opened below the threshold value, or vice versa, wherein “vice versa” then signifies that the control rule is designed in such a way that the vent is closed below a threshold value for the environmental parameter and is opened above the threshold value. Which of the two variants is used depends, in particular, on the specific application and on the environmental parameter. In any event the threshold value is chosen user-specifically, whereby the control rule is then configured user-specifically. In the simplest case, the control rule is a step function that assigns a first value to the degree of opening below the threshold value and a different, second value above the threshold value. It is significant here that the threshold value is decidedly not a value that is the same for all users, but that the threshold value is chosen user-specifically in order in this way to adjust the opening and closing of the vent to the needs of the particular user. Depending on the user, the vent is then opened earlier or later along the dimension of the environmental parameter (and analogously closed earlier or later in the other direction).

In the case in which the environmental volume is the environmental parameter, for example, the vent is closed earlier or later, depending on the user, as the environmental volume rises. The more aggressively the control rule is configured for a particular user, the earlier the vent is closed. Conversely, the vent is opened earlier or later, depending on the user, as the environmental volume falls. The more aggressively the control rule is configured for a particular user, the later the vent is opened.

In an expedient embodiment, the threshold value for the user is chosen from an interval between 60 dB and 90 dB. A configuration range of 30 dB accordingly results for the control rule, from which, depending on the user, a respectively suitable threshold value is chosen and set. If the threshold value is chosen relatively high, then the vent is closed later for this user, and conversely opened earlier, than for a different user for which a relatively low threshold value is chosen.

In place of the environmental volume, other environmental parameters are also conceivable and suitable, for example an SNR (signal to noise ratio) of the environment, or a probability for the presence of disturbing noises in the environment ascertained by means of a classifier. The environmental volume is particularly suitable, since this is measured easily, for example with a microphone of the hearing aid that is in any case present, in combination with a level-measuring device of the hearing aid.

Since the control rule is user-specifically configured, it is in particular also in principle adjustable, at least during the manufacture of the hearing aid, but also expediently alternatively or in addition later, for example in the context of an adjustment of the hearing aid, i.e., during what is known as a “fitting session”, or by the user themself, in particular in the course of operation.

In general, the control rule is preferably adjustable by the user of the hearing aid, namely by means of a user interface that is displayed on a supplementary device and which has one or a plurality of graphic control elements for adjusting the control rule.

In particular, preferably, the threshold value already mentioned can be adjusted by the user of the hearing aid, namely by means of a user interface that is displayed on a supplementary device, in particular on a smartphone, and which comprises an in particular graphic control element for adjusting the threshold value. “Graphic” here in particular means that the control element is purely virtual, and is displayed as operable graphic, and is not itself a mechanical control element. In one suitable embodiment, the control element displays a value range (i.e., configuration range) for the threshold value, and comprises an adjusting element in order to select a value as the threshold value from this value range. A slide controller, also known as a slider, and which, for example, is an elongated bar along which a slider (as the adjusting element) can be moved in order to choose the threshold value, is particularly suitable as the control element. The bar here has a length that indicates the configuration range. In the example of the environmental volume with a configuration range from 60 dB to 90 dB, a left-hand end of the bar marks, for example, 90 dB, and a right-hand end 60 dB, and the slider can be moved between them over the configuration range of 30 dB, in order to choose and set a value between 60 dB and 90 dB. Instead of labelling the slide controller with specific values, qualitative statements are used in one suitable embodiment. Statements such as “close early” and “open late” are, for example, used, in order to clarify to the user the behavior of the vent resulting from this. A rotary controller with a rotary knob, or other similar control elements, are also suitable as an adjusting element is an alternative to the slide controller. The explanations relating to the slide controller also apply analogously to any other graphic control elements.

The supplementary device is preferably a smartphone, and similar devices are deemed to be equivalent. The supplementary device is, in particular, connected to the hearing aid for control purposes, preferably via a wireless connection, for example Bluetooth, Wi-Fi or similar methods. A program is carried out on the supplementary device which, when installed on the supplementary device, generally makes a user interface available, in particular displays it, which has one or a plurality of graphic control elements for configuring a control rule in a hearing aid as described above and below. The slide controller already described is accordingly a graphic control element. Alternatively, or in addition, however, mechanical control elements are in principle also suitable, for example as part of a remote control unit or as part of the hearing aid itself. Preferably the program is an app.

In some environmental situations it is expedient to ignore the degree of opening that is specified by the control rule, and to enable an exception. The exception is, in particular, also user-specific in order to address further special needs of the respective user specifically. In one advantageous embodiment, the control rule has an exception rule for this purpose for at least one environmental situation, so that when this environmental situation is recognized, the vent is opened or closed in accordance with the exception rule, rather than depending on the environmental parameter. The environmental situation is, for example, a car journey, using a TV, a telephone call, a movement of the user in the open, in particular walking or running. Accordingly, the exception rule is “vent always opened on car journeys”, “vent always closed when watching television”, “vent always closed when telephoning”, “vent always opened when walking outside” or the like. The vent is then always closed or always opened in these situations, regardless of the environmental parameter, provided the user wants this. The environmental situation is recognized, for example, by means of a classifier to which the input signal of the input transducer is fed. Alternatively or in addition, the environmental situation is recognized by means of another sensor, for example by means of an acceleration sensor.

It is appropriate if the exception rule can be switched on and off by the user of the hearing aid, namely by means of a user interface that is displayed on a supplementary device, in particular a smartphone, and which has a switch for switching the exception rule on and off. The user interface is expediently the user interface already mentioned above and the supplementary device is accordingly expediently the supplementary device already mentioned above. In one advantageous embodiment the switch is a graphic control element, for example what is known as a “checkbox”. If multiple exception rules are present, the user interface accordingly has a separate switch for each exception rule.

Alternatively, or in addition to the user-specific configuration by means of a user interface for the user, in one advantageous embodiment, the control rule is configured user-specifically by means of a digital assistant, in that this receives answers to one or a plurality of questions from the user of the hearing aid, and then configures the control rule with reference to these answers. The digital assistant is preferably implemented on the supplementary device already described, and is appropriately a part of the program already mentioned. The questions are, for example, chosen in such a way that the user is asked what kind of behavior they expect in specific environmental situations, or the extent to which the user feels disturbed by, on the one hand, their own voice and, on the other hand, disturbing noises.

The satisfaction with the former behavior of the hearing aid in environmental situations that have already been experienced is also appropriately used for configuration of the control rule. In one advantageous embodiment, the control rule is configured user-specifically by means of a digital assistant, in that this receives feedback on the operation of the hearing aid from the user of the hearing aid, and then configures the control rule on the basis of this feedback. The digital assistant is, for example, the digital assistant already mentioned. The feedback, for example, simply expresses dissatisfaction with the operation in a specific environmental situation, whereupon the control rule is adjusted in order to avoid repeated dissatisfaction. If, for example, a very high threshold value is chosen and the user provides negative feedback in this respect, the threshold value is then reduced. The feedback can also be specific, for example in that the user perceives their own voice too strongly, whereupon, for example, the threshold value is correspondingly raised in order to keep the vent open as often as possible and to avoid occlusion. Another specific feedback is, for example, that the user feels that environmental noises are too loud, whereupon, for example, the threshold value is correspondingly lowered, in order to keep the vent closed as often as possible and to attenuate environmental noises or to enable directional hearing.

It is also advantageous to configure the control rule user-specifically by means of an adaptation software in the context of a session for adjusting the hearing aid. Such a session is also referred to as a “fitting session” and usually takes place in connection with a visit to an audiologist or other specialized expert. The explanations relating to accepting the answers of the user to questions and to feedback of the user can be applied analogously to the configuration in the context of the session.

A combination of the active vent with a measurement of a hearing effort or of a stress level of the user by means of a suitable sensor, for example a sensor for performing an EEG or EMG, is also advantageous. A hearing effort of the user is preferably ascertained here, in particular from an EEG signal or an EMG signal. During the use as intended, the control rule is then configured, depending on the hearing effort, in such a way that this is reduced. This is also referred to as dynamic control of the vent, since the control rule is regularly adjusted, i.e., adjusted dynamically to changing environmental situations and their influence on the user. The EEG or EMG signal is, for example, measured by means of one or a plurality of electrodes which are preferably parts of the hearing aid and which, during use as intended, lie in particular in or at the ear of the user in order to measure there. Suitable methods and embodiments of the hearing aid for ascertaining the hearing effort, as well as the term “hearing effort” are described in detail in our commonly assigned European published patent applications EP 3 445 068 A1 and EP 3 445 067 A1.

As soon as an increase in the hearing effort is ascertained, a measure is expediently taken to reduce the hearing effort. A suitable measure is, above all, a configuration of the control rule in order to adjust the control of the vent to the specific needs of the user. In one advantageous embodiment, the threshold value is reduced here, so that the vent is thus closed at a lower environmental volume, i.e., earlier, so that the SNR is improved in loud environments. In one expedient embodiment the threshold value is analogously increased, i.e., the vent is closed later, as soon as it is then detected that the hearing effort falls once more.

Preferably the hearing aid, the supplementary device, or both in combination, are designed in such a way that they learn in which environmental situations the hearing effort reliably rises, so that the control rule is then accordingly configured predictively, or the vent is correspondingly opened or closed predictively. In one appropriate embodiment, the opening and closing of the vent is controlled dynamically, in particular repeatedly, by means of a learning machine, in that it anticipates—in particular on the basis of previous measurements—the hearing effort of the user in a given environmental situation, and then opens or closes the vent in order to reduce the hearing effort.

The said concept of the control of the vent and/or the configuration of the control rule on the basis of the individual hearing effort of the user can also be combined with other sensors, or transferred to embodiments with other sensors and/or other individual indicators apart from the hearing effort. What is essential is that the individual needs of the user are recognized in a given environmental situation, and on that basis the opening and closing of the vent is adjusted in order to address these needs. In one exemplary and expedient embodiment, the opening and closing of the vent is also controlled depending on a stress level of the user, wherein the stress level is determined on the basis of a photoplethysmography signal (abbreviated to PPG signal) or of a signal of an acceleration sensor. Photoplethysmography is also known as pulse oximetry.

The hearing aid, and thereby also the vent and the control rule, are typically configured with a factory setting at the time of manufacture, and are then later adjusted to a specific user. A first user-specific configuration of the control rule is also then expediently specified as a starting point during this adjustment, and is preferably optimized user-specifically during the further use as intended of the hearing aid. A variety of embodiments are suitable for determining an appropriate first user-specific configuration, some of which are described in more detail below. These can also be combined with one another.

In a first suitable embodiment, using a digital assistant, questions are asked of the user whose answers are received, as already described further above. A first user-specific configuration is then ascertained from the answers.

In a second suitable embodiment, the control rule is user-specifically configured in that a variety of audio files that simulate various environmental situations are played to the user, and in that an evaluation of these by the user is received, on the basis of which the control rule is then configured. The audio files are, for example, output via the output transducer of the hearing aid, or by means of a separate device, for example headphones. The user, for example, evaluates each audio file either as comfortable or uncomfortable, and the control rule is then configured depending on the feedback. This can be used both for the ascertainment of a first user-specific configuration as well as for further optimization.

In a third suitable embodiment, the control rule is configured user-specifically in that in the context of an acceptance measurement a test noise is played to the user with rising intensity, and the user is asked for feedback on reaching an acceptance threshold for the intensity, whereupon the acceptance measurement is ended and the control rule is configured depending on the intensity then reached. The appropriate rule therefore is that the higher the acceptance threshold, the higher is the selected threshold value. In the simplest case, the threshold value corresponds to the acceptance threshold. In some circumstances, this is faster than the first and second embodiments described above, although possibly less accurate. This procedure can also be used both for the ascertainment of a first user-specific configuration as well as for further optimization.

The hearing aid according to the invention is designed to carry out a method as described above. A controllable vent in particular, and the use of a control rule, are essential for this. The control rule is preferably stored on the hearing aid, or alternatively on a supplementary device as described above. The hearing aid further comprises a control unit that is designed to carry out the method. The method is advantageously carried out with the hearing aid in combination with a supplementary device as described. The supplementary device and the hearing aid together form a hearing aid system.

Other features which are considered as characteristic for the invention are set forth in the appended claims.

Although the invention is illustrated and described herein as embodied in a method for operating a hearing aid, a hearing aid, and a computer program product, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
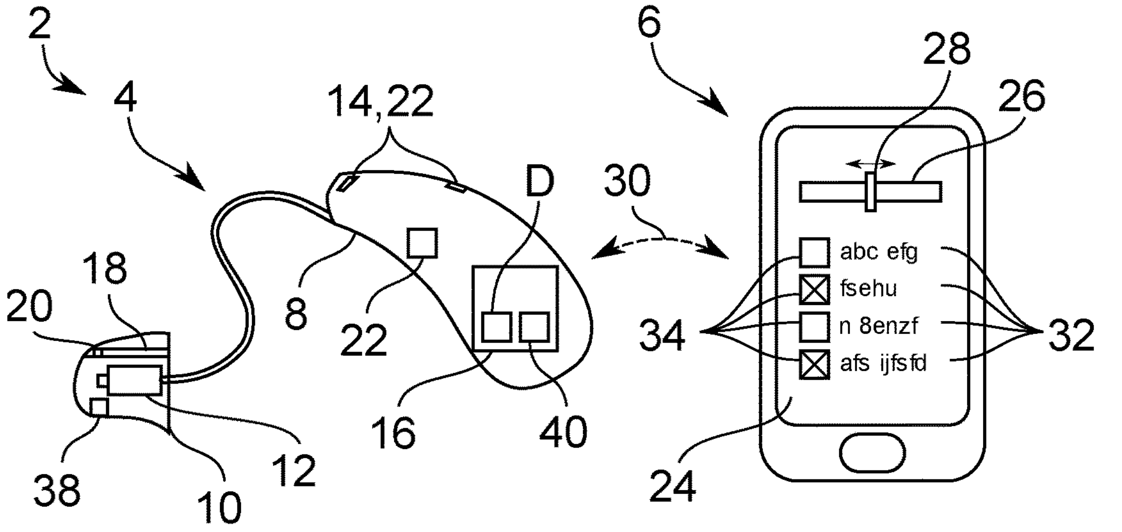
FIG. 1 shows a schematic diagram of a hearing aid system with a hearing aid and a supplementary device.

Referring now to the figures of the drawing in detail and first, in particular, to FIG. 1 thereof, there is shown a hearing aid system 2 with a hearing aid 4 and a supplementary device 6. The hearing aid 4 here is an RIC (receiver-in-canal) hearing aid with a housing 8 that is carried behind the ear, and with an earpiece 10 that comprises an earphone 12, and is inserted into the auditory canal of a user, not shown in more detail. A change of user is typically not provided for. The explanations provided here also apply analogously to other types of hearing aid. The hearing aid 4 is used to output an audio signal to the user. The output is made here by means of an output transducer, in this case by means of the earphone 12 already mentioned. In the present case the hearing aid 4 serves particularly to supply sound to a user with a hearing deficit, and for this purpose comprises at least one acoustic input transducer, in the present case a plurality of microphones 14, and a control unit 16. The explanations made here also however apply analogously to hearing aids in general, for example what are known as tinnitus-maskers, headsets, headphones and the like.

The hearing aid 4 has a vent 18 to avoid occlusion. The vent 18 is a part of the earpiece 10, and in this case is, by way of example, a simple channel or conduit. The earpiece 10 is worn by the user in the auditory canal when used as intended. The purpose of the vent 18 is to establish a connection between the two sides of the earpiece 10, and to reduce an occlusion, i.e., closure, and an occlusion effect caused thereby. An exchange of air between the environment and a partial volume of the auditory canal that is closed by the earpiece 10 is enabled by the vent 18. Sound signals that are output by the output transducer can reach the environment through the vent 18, and can be recorded there by the input transducer.

The vent 18 comprises an adjustable closure 20 for opening and closing the vent 18, i.e., to set a degree of opening O of the vent 18. The closure 20 is, for example, a valve. If the vent 18 is fully opened, it lets air through and the degree of opening O amounts, for example, to "1". If the vent 18 is fully closed, it lets no air through and the degree of opening O amounts, for example, to "0". Without restricting the generality, a vent 18 is assumed below that is either open or closed, and thus has two degrees of opening O; the explanations below nevertheless apply analogously to vents 18 with other and/or more possible states.

Figure 2:
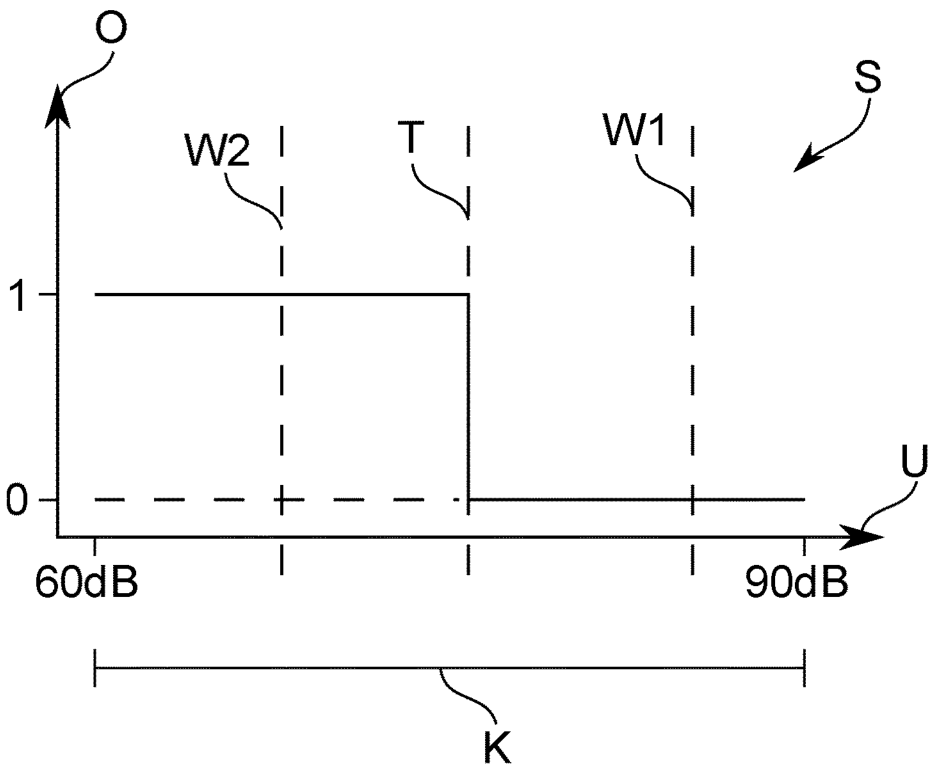
FIG. 2 is a graph showing a control rule.

The opening and closing of the vent 18, and in particular the degree of opening O, are linked to an environmental parameter U by a control rule S. The control rule S is thus a function of the environmental parameter U, and specifies an appropriate degree of opening O corresponding to different values of this environmental parameter U. The precise embodiment of the environmental parameter U and of the control rule S is not initially relevant; only the connection between the opening and closing of the vent 18 and the environmental parameter U, so that an active vent 18 is realized that is opened and closed automatically depending on the environmental parameter U, is important at first. A particularly simple, exemplary control rule S is shown in FIG. 2.

In operation, the vent 18 is now automatically controlled depending on the environmental parameter U, in that the environmental parameter U is ascertained and the vent 18 is opened or closed, i.e., in that the degree of opening O is set, in accordance with the control rule S depending on the environmental parameter U. The environmental parameter U is measured by way of an appropriate sensor 22, for example using a microphone 14 of the hearing aid 4 or by way of another sensor 22.

An important aspect is, in this case, that the control rule S is configured user-specifically, i.e., that the opening and closing of the vent 18 is adjusted individually to the user.

It is helpful in some environments to open the vent 18 initially, while in other environments it is more helpful to close the vent 18. This is taken into consideration by the controller depending on the environmental parameter U, wherein the environmental parameter U characterizes the environment and thus supplies an indication as to which degree of opening O is most helpful at the moment. This is realized by the control rule S. It is, moreover, also recognized in the present case that the assessment as to whether the vent 18 would be better open or closed in a given environment also has a subjective aspect that depends on the user. This is now taken into consideration, in that the control rule S is configured user-specifically. As a result it is possible that a different degree of opening O is chosen for the vent 18 for different users in the same environment with the same environmental parameter U; in an extreme case the vent 18 is fully opened for one user and fully closed for a different user in the same environment, i.e., with the same environmental parameter U. In the example of FIG. 2, the step of the step function shown there would be accordingly moved to the left or right for a different user.

Basically, the vent 18 is in the present case opened if the environmental parameter U indicates a quiet environment, i.e., an environment with little disturbing noise. Conversely, the vent 18 is closed if the environmental parameter U indicates a loud environment, i.e., an environment with strong disturbing noise. A closed vent 18 is also generally used when the noises from the environment are not significant, in particular when audio streaming with the hearing aid 4 or when telephoning with the hearing aid 4. It will be clear from what has just been said that a balance is reached as to when the vent 18 is opened and when it is closed. In the present case the preferences of the respective user are taken into consideration in achieving this balance through the control rule S being configured user-specifically, so that the opening and closing of the vent 18 is matched to the needs of the user. Whereas some users react very sensitively to disturbing noises, and reach a high level of stress quickly in their presence, other users are rather more sensitive to the perception of their own voice. For the first users, the vent 18 is therefore closed early or aggressively, i.e., for example, as soon as disturbing noises are detected in the environment, whereas for the latter users the vent 18 is closed particularly late or defensively, in order to avoid the occlusion effect in as many environmental situations as possible. Precisely how the control rule S is configured for this purpose, and then represents the corresponding behavior, depends on the respective user, and can accordingly differ greatly. The key point is that a degree of opening O for the vent 18 is assigned to a respective value of the environmental parameter U.

In the present case the environmental parameter U is an environmental volume (i.e., an ambient volume or ambient noise). The environmental volume is, in particular, a measure for the presence of disturbing noises; the greater the environmental volume is, the stronger, i.e., the louder, the disturbing noises in the environment are. The environmental volume is, for example, measured with a microphone 14 that is present in any case in combination with a level-measuring device, not shown explicitly, in the control unit 16 of the hearing aid 4. Depending on the environmental volume, the vent 18 is then opened or closed, wherein the precise values or intervals of the environmental volume U for which an opening or closing results are user-specific, so that in spite of the same environmental volume it may occur that different degrees of opening O are set for two different users. In the present case, the vent 18 is closed at a first value W1 of the environmental volume and opened at a second value W2 that is lower than the first value W1. This behavior is also illustrated in FIG. 2. The vent 18 is thereby opened at a low environmental volume and closed at a high environmental volume.

In the exemplary embodiment of FIG. 2, the control rule S is configured so that the vent 18 is closed above a threshold value T for the environmental parameter U and is opened below the threshold value T. The threshold value is chosen here user-specifically, whereby the control rule S is configured user-specifically. In the simplest case, the control rule S, as shown in FIG. 2, is a step function that assigns a first value, here "1", to the degree of opening O below the threshold value T and a different, second value, here "0", above the threshold value T. It is significant here that the threshold value T is decidedly not a value that is the same for all users, but that the threshold value T is chosen user-specifically in order in this way to adjust the opening and closing of the vent 18 to the needs of the particular user. Depending on the user, the vent 18 is then opened earlier or later along the dimension of the environmental parameter U (i.e., along the horizontal axis in FIG. 2) (and analogously closed earlier or later in the other direction). In the case in which the environmental volume is the environmental parameter U, the vent 18 is accordingly closed earlier or later, depending on the user, as the environmental volume rises. The more aggressively the control rule S is configured for a particular user, the earlier the vent 18 is closed. Conversely, the vent 18 is opened earlier or later, depending on the user, as the environmental volume falls. The more aggressively the control rule S is configured for a particular user, the later the vent 18 is opened.

The threshold value T for the user is, for example, selected from an interval between 60 dB and 90 dB, as shown in FIG. 2. Other intervals are also possible. A configuration range K of 30 dB accordingly results for the control rule S, from which, depending on the user, a respectively suitable threshold value T is chosen and set. If the threshold value T is chosen higher, then the vent 18 is closed later for this user, and conversely opened earlier, than for a different user for which a relatively low threshold value T is chosen.

Generally speaking in the present case, the control rule S, and in particular the threshold value T already mentioned, can be adjusted by the user of the hearing aid 4, namely by means of a user interface 24 that is displayed on the supplementary device 6 and which, for example, has a slide controller 26 as a control element for setting the threshold value T. This is shown in FIG. 1. The slide controller 26 is, for example, an elongated bar along which a slider 28 can be moved in order to choose the threshold value T. The bar shown here has a length that indicates the configuration range K mentioned above. In the example of the environmental volume with a configuration range K from 60 dB to 90 dB, a left-hand end of the bar marks, for example, 90 dB, and a right-hand end 60 dB, and the slider 28 can be moved between them over the configuration range K of 30 dB (indicated by an arrow in FIG. 1), in order to choose a value between 60 dB and 90 dB.

The supplementary device 6 shown here by way of example is a smartphone. It is connected to the hearing aid 4 for its control, in the present case via a wireless connection 30. A program is executed on the supplementary device 6 which, when installed on the supplementary device 6, generally makes a user interface 24 available and, in the present case, also displays it. The user interface 24 has one or a plurality of graphic control elements for configuration of the control rule S. The slide controller 26 is accordingly a graphic control element. The program here is an app for the smartphone. Alternatively or in addition, mechanical control elements are, however, in principle also suitable.

In some environmental situations it is expedient to ignore the degree of opening O that is specified by the control rule S, and to enable an exception. The exception is also user-specific in order to address further special needs of the respective user specifically. In the embodiment of FIG. 1, the control rule S has an exception rule 32 for at least one environmental situation, so that when this environmental situation is recognized, the vent 18 is opened or closed in accordance with the exception rule 32, rather than depending on the environmental parameter U. The environmental situation is, for example, a car journey, using a TV, a telephone call, a movement of the user in the open, in particular walking or running. The exception rule 32 is accordingly "vent always opened on car journeys", "vent always closed when watching television", "vent always closed when telephoning" or "vent always opened when walking outside". A random text is shown in FIG. 1 as a placeholder for these exception rules 32 for illustration purposes. The environmental situation is recognized, for example, by means of a classifier, not shown explicitly, in the control unit 16 to which the input signal of the input transducer is fed. Alternatively or in addition, the environmental situation is recognized by means of another sensor 22.

In the present case, the exception rule 32 can be switched on and off by the user of the hearing aid 4, namely by means of the user interface 24 which has a switch 34 for switching the exception rule 32 on and off. The switch 34 is here a graphic control element, and in particular what is known as a "checkbox". If multiple exception rules 32 are present, as shown in FIG. 1, the user interface 24 accordingly has a separate switch 34 for each exception rule 32.

Figure 3:
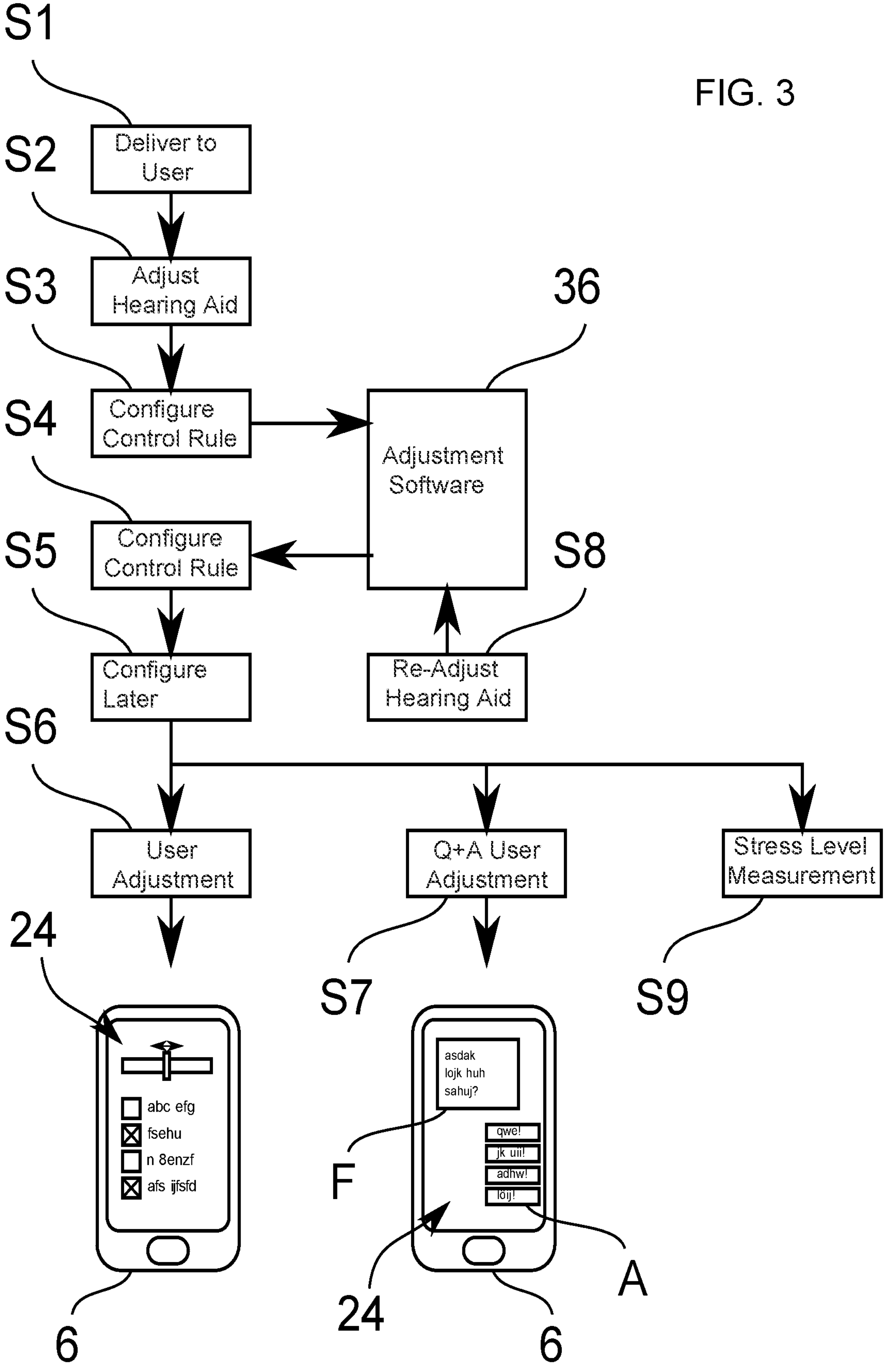
FIG. 3 is a flowchart showing various concepts in a method for operation of a hearing aid.

FIG. 3 shows a number of concepts related to the configuration of the control rule S, including also the concept, already described, in which a user-specific configuration takes place by means of the user interface 24.

Basically, the hearing aid 4 is delivered or given to the user in step S1. In the second step S2 the hearing aid 4 is then adjusted for the first time to the user with the help of specialist staff. The specialist staff is, for example, an audiologist who configures the control rule S user-specifically for the first time by means of an adjustment software 36 in a third step S3. The adjustment software 36 comprises, for example, a user interface with at least the same functions as the user interface 24 already mentioned above, for which reason a renewed illustration is omitted. The adjustment of the hearing aid 4 is then finalized in a fourth step S4. The adjustment sitting is thus completed, and the user can make everyday use of the hearing aid 4 as intended. The step S5 then indicates that the control rule S can also be further configured at a later time point, i.e., during the use as intended, in order to be further optimized. The steps S6-S9 each contain a concept in this connection. The adjustment by the user themselves by means of a user interface 24 on a supplementary device 6 is illustrated by the step S6, and was already described above.

In a seventh step S7, the control rule S is configured user-specifically by means of a digital assistant, in that said assistant receives answers A from the user of the hearing aid 4 to one or more questions F, and then configures the control rule S on the basis of these answers A. A random text is shown in FIG. 3 as a placeholder for these questions F and answers A for illustration purposes. The digital assistant is implemented here on the supplementary device 6 already described, and is appropriately a part of the program already referred to. The questions F and answers A are shown here on a screen; the digital assistant can, however, alternatively or in addition, also be operated entirely under voice control. The questions F are, for example, chosen in such a way that the user is asked what kind of behavior they expect in specific environmental situations, or the extent to which the user feels disturbed by, on the one hand, their own voice and, on the other hand, disturbing noises or an environmental volume made loud by said noises.

In one embodiment, the satisfaction with the former behavior of the hearing aid 4 in environmental situations that have already been experienced is also used in the seventh step S7 for configuration of the control rule S. The digital assistant is again used for this purpose, in that it receives feedback on the operation of the hearing aid 4 from the user of the hearing aid 4, and then configures the control rule S on the basis of this feedback. The procedure is fundamentally similar to that in connection with the questions F and answers A, wherein the feedback is essentially equivalent to an answer A, and is therefore not explicitly illustrated in the figures. The feedback, for example, simply expresses dissatisfaction with the operation in a specific environmental situation, whereupon the control rule S is adjusted in order to avoid repeated dissatisfaction. If, for example, a very high threshold value T is chosen and the user provides negative feedback in this respect, the threshold value T is then reduced. The feedback can also be specific, for example in that the user perceives their own voice too strongly, whereupon, for example, the threshold value T is correspondingly raised in order to keep the vent 18 open as often as possible and to avoid occlusion. Another specific feedback is, for example, that the user feels that environmental noises are too loud, whereupon, for example, the threshold value T is correspondingly lowered, in order to keep the vent 18 closed as often as possible and to attenuate environmental noises or to enable directional hearing.

A renewed configuration of the control rule S by means of the adjustment software 36 already described takes place in the eighth step S8 in the context of a new sitting for adjusting the hearing aid 4.

A combination of the active vent 18 with a measurement of a hearing effort or of a stress level of the user is also possible in a ninth step S9 by means of a suitable sensor 38, for example for performing an EEG or EMG. In FIG. 1 the sensor 38 is shown, by way of example, as a part of the earpiece 10, but can however in principle also be placed at another location of the hearing aid, or even separately therefrom, for example as part of the supplementary device 6, depending on what the sensor 38 measures. In the present case, a hearing effort of the user is ascertained from an EEG signal in the exemplary embodiment of FIG. 1, or from an EMG signal that is generated with the sensor 38, which accordingly is designed as an electrode. The control rule S is then configured, depending on the hearing effort, in the course of intended use in such a way that this is reduced. As soon as an increase in the hearing effort is ascertained during operation, a measure is taken to reduce the hearing effort. A suitable measure is an optimization of the control rule S in order to adjust the control of the vent 18 to the specific needs of the user. In one embodiment, the threshold value T is reduced here, so that the vent 18 is thus closed at a lower environmental volume, i.e., earlier, and the SNR is thus improved in loud environments. In one embodiment the threshold value T is analogously increased, i.e., the vent 18 is closed later, as soon as it is then detected that the hearing effort falls once more.

In a further embodiment, the hearing aid 4, the supplementary device 6, or both in combination, are designed in such a way that they learn in which environmental situations the hearing effort reliably rises, so that the control rule S is then accordingly configured predictively, or the vent 18 is correspondingly opened or closed predictively. In FIG. 1 the opening and closing of the vent 18 is repeatedly dynamically controlled by means of a learning machine 40, in that it anticipates—on the basis of previous measurements—the hearing effort of the user in a given environmental situation, and then opens or closes the vent 18 in order to reduce the hearing effort. The learning machine 40 here is a part of the control unit 16, while in another embodiment the learning machine 40 is arranged outside the hearing aid 4, for example as part of the supplementary device 6.

In the ninth step S9, the said concept of the control of the vent 18 and/or the configuration of the control rule S on the basis of the individual hearing effort of the user can also be combined with other sensors 22, 38, or transferred to embodiments with other sensors 38 and/or other individual indicators apart from the hearing effort. What is essential is that the individual needs of the user are recognized in a given environmental situation, and on that basis the opening and closing of the vent 18 is adjusted in order to address these needs. In a corresponding embodiment, the opening and closing of the vent 18 is also controlled depending on a stress level of the user, wherein the stress level is determined on the basis of a photoplethysmography signal (abbreviated to PPG signal), e.g. measured with the correspondingly designed sensor 38, or of a signal of an acceleration sensor 38.

The hearing aid 4, and thereby also the vent 18 and the control rule S, are typically configured with a factory setting at the time of manufacture and before the first step S1, and are then later adjusted to a specific user, as described above in connection with steps S1-S4. A first user-specific configuration of the control rule S is also then specified as a starting point during this adjustment, and is user-specifically optimized during the further use of the hearing aid 4 as intended.

In a possible embodiment, the control rule S is user-specifically configured in that a variety of audio files D that simulate various environmental situations are played to the user, and in that an evaluation of these is received, on the basis of which the control rule S is then configured. The audio files D are output in FIG. 1 via the output transducer of the hearing aid 4. The user, for example, evaluates each audio file D either as comfortable or uncomfortable, and the control rule S is then configured depending on the feedback. The feedback is, for example, given by voice input or via the user interface 24. The audio files D are stored in FIG. 1 in the hearing aid 4, but can also equally well be stored in the supplementary device 6 or somewhere else.

Figure 4:
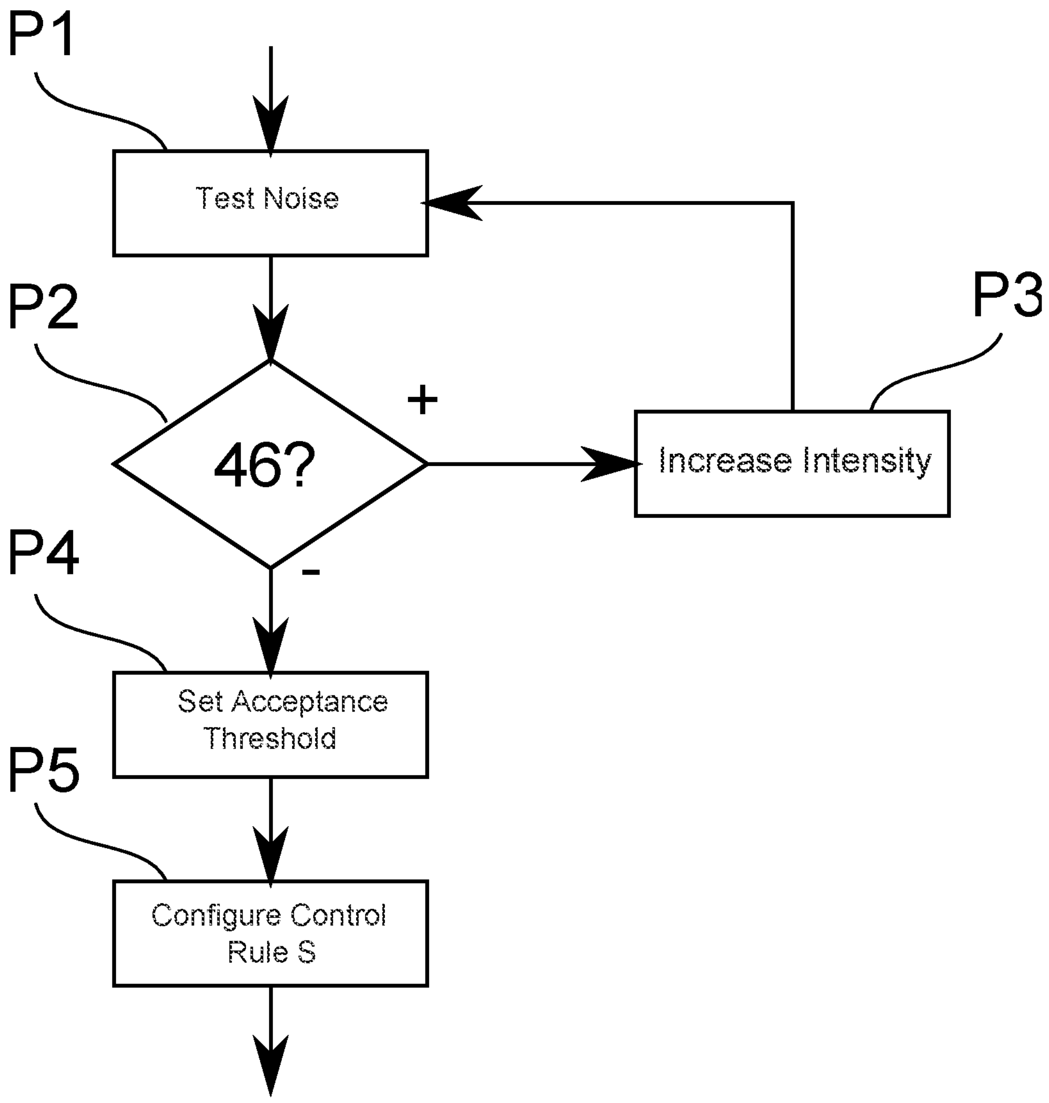
FIG. 4 shows a diagram of an acceptance measurement.

In a further suitable embodiment, the control rule S is configured user-specifically in that in the context of an acceptance measurement a test noise is played to the user with rising intensity 42, and the user is asked for negative feedback 46 on reaching an acceptance threshold 44 for the intensity 42, whereupon the acceptance measurement is ended and the control rule S is configured depending on the intensity 42 then reached. The intensity 42 corresponds, for example, to the environmental parameter U in the case in which this indicates the environmental volume. The rule therefore is that the higher the acceptance threshold 44, the higher the selected threshold value T. In the simplest case, the threshold value T corresponds to the acceptance threshold 44. The procedure is illustrated schematically in FIG. 4. The test noise is played in step P1, and the feedback 46 of the user is checked in step P2. If the feedback 46 is positive or is not provided, the intensity 42 is increased in step P3, and the step P1 is carried out again; if the feedback is negative, the acceptance measurement is interrupted and the intensity 42 is defined in step P4 as the acceptance threshold 44. The control rule S is configured on this basis in step P5.

The following is a summary list of reference numerals and the corresponding structure used in the above description of the invention:

2 Hearing aid system
4 Hearing aid
6 Supplementary device
7 Housing
10 Earpiece
12 Earphone
14 Microphone
16 Control unit
18 Vent
20 Closure
22 Sensor (for environmental parameter)
24 User interface
26 Slide controller
28 Slider
30 Wireless connection
34 Exception rule
34 Switch
36 Adjustment software 38 Sensor
40 Learning machine
42 Intensity
44 Acceptance threshold
46 Feedback
A Answer
D Audio file
F Question
K Configuration range
Degree of opening
P1-P5 First to fifth steps
S Control rule
S1-S9 First to ninth steps
T Threshold value
U Environmental parameter
W1 First value
W2 Second value

The invention claimed is:

1. A method of operating a hearing aid of a user, the method comprising:
providing the hearing aid with a vent and an adjustable closure for selectively opening and closing the vent;
linking the opening and closing of the vent to an environmental parameter by a control rule;
controlling the vent in dependence on the environmental parameter, by acquiring the environmental parameter and selectively opening or closing the vent in accordance with the control rule in dependence on the environmental parameter;
configuring the control rule user-specifically for the user; and
wherein the control rule has an exception rule for at least one environmental situation, and when the at least one environmental situation is recognized, the vent is opened or closed in accordance with the exception rule, rather than depending on the environmental parameter.

2. The method according to claim 1, wherein the environmental parameter is an environmental volume or a signal-to-noise ratio of the environment.

3. The method according to claim 1, which comprises adjusting the control rule by the user of the hearing aid, by way of a user interface that is displayed on a supplementary device and that has one or a plurality of graphic control elements for adjusting the control rule.

4. The method according to claim 3, wherein the supplementary device is a smartphone.

5. The method according to claim 1, wherein:
the control rule is configured to cause the vent to be closed when the environmental parameter exceeds a threshold value and to be opened when the environmental parameter falls below the threshold value, or vice versa; and
the threshold value is a user-specifically chosen threshold value.

6. The method according to claim 5, wherein the threshold value is adjustable by the user of the hearing aid, by way of a user interface that is displayed on a supplementary device which has a control element for adjusting the threshold value.

7. The method according to claim 1, which comprises displaying the exception rule on a supplementary device having a switch for switching the exception rule on and off, and enabling the user of the hearing aid to selectively switch the exception rule on or off.

8. The method according to claim 1, which comprises providing a digital assistant for user-specifically configuring the control rule, wherein the digital assistant receives answers from the user of the hearing aid to one or more questions, and then configures the control rule based on the answers.

9. The method according to claim 1, which comprises providing a digital assistant for user-specifically configuring the control rule, wherein the digital assistant receives feedback on an operation of the hearing aid from the user of the hearing aid, and then configures the control rule based on the feedback.

10. The method according to claim 1, which comprises configuring the control rule user-specifically by playing to the user a variety of audio data that simulate various environmental situations, and upon receiving an evaluation of the audio data, configuring the control rule based on the evaluation of the audio data.

11. The method according to claim 1, which comprises configuring the control rule user-specifically with an acceptance measurement by playing a test noise to the user with rising intensity, asking the user for feedback upon reaching an acceptance threshold for the intensity, and subsequently ending the acceptance measurement and configuring the control rule in dependence on the intensity then reached.

12. A method of operating a hearing aid of a user, the method comprising:
providing the hearing aid with a vent and an adjustable closure for selectively opening and closing the vent;
linking the opening and closing of the vent to an environmental parameter by a control rule;
controlling the vent in dependence on the environmental parameter, by acquiring the environmental parameter and selectively opening or closing the vent in accordance with the control rule in dependence on the environmental parameter; and
configuring the control rule user-specifically for the user;
ascertaining a hearing effort of the user; and
configuring the control rule of the hearing aid depending on the hearing effort in order to reduce the hearing effort.

13. The method according to claim 12, which comprises ascertaining the hearing effort of the user from an EEG signal or an EMG signal.

14. A method of operating a hearing aid of a user, the method comprising:
providing the hearing aid with a vent and an adjustable closure for selectively opening and closing the vent;
linking the opening and closing of the vent to an environmental parameter by a control rule;
controlling the vent in dependence on the environmental parameter, by acquiring the environmental parameter and selectively opening or closing the vent in accordance with the control rule in dependence on the environmental parameter; and
configuring the control rule user-specifically for the user; and
dynamically controlling the opening and closing of the vent by way of a learning machine, wherein the learning machine anticipates a hearing effort of the user in a given environmental situation, and then opens or closes the vent in order to reduce a hearing effort by the user.

15. A method of operating a hearing aid of a user, the method comprising:
providing the hearing aid with a vent and an adjustable closure for selectively opening and closing the vent;
linking the opening and closing of the vent to an environmental parameter by a control rule;

controlling the vent in dependence on the environmental parameter, by acquiring the environmental parameter and selectively opening or closing the vent in accordance with the control rule in dependence on the environmental parameter; and configuring the control rule user-specifically for the user; and controlling the opening and closing of the vent depending on a stress level of the user and determining the stress level on a basis of a photoplethysmography signal or of a signal of an acceleration sensor.

16. A hearing aid, configured to carry out the method according to claim 1.

17. A non-transitory computer program product, comprising executable program code which, when installed on a supplementary device, provides a user interface with one or more graphic control elements for configuring a control rule in a hearing aid which is configured to carry out the method according to claim 1.

18. The computer program product according to claim 17, wherein the supplementary device is a smartphone.

19. The computer program product according to claim 17, wherein the program code is stored in a non-transitory file.

20. A hearing aid, configured to carry out the method according to claim 12.

21. A hearing aid, configured to carry out the method according to claim 14.

22. A hearing aid, configured to carry out the method according to claim 15.

23. A non-transitory computer program product, comprising executable program code which, when installed on a supplementary device, provides a user interface with one or more graphic control elements for configuring a control rule in a hearing aid which is configured to carry out the method according to claim 12.

24. A non-transitory computer program product, comprising executable program code which, when installed on a supplementary device, provides a user interface with one or more graphic control elements for configuring a control rule in a hearing aid which is configured to carry out the method according to claim 14.

25. A non-transitory computer program product, comprising executable program code which, when installed on a supplementary device, provides a user interface with one or more graphic control elements for configuring a control rule in a hearing aid which is configured to carry out the method according to claim 15.

* * * * *